US011554696B2

(12) United States Patent
Hu et al.

(10) Patent No.: US 11,554,696 B2
(45) Date of Patent: Jan. 17, 2023

(54) ANTI-SUBMARINE ARRANGEMENT FOR A VEHICLE SEAT

(71) Applicant: Lear Corporation, Southfield, MI (US)

(72) Inventors: Zhiqiang Hu, Shanghai (CN); Junjie Mo, Shanghai (CN); Suhua Zhou, Shanghai (CN); Jianliang Ma, Shanghai (CN); Rahul Deshmukh, Amravati (IN); Yue Zuo, Shanghai (CN)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/494,764

(22) Filed: Oct. 5, 2021

(65) Prior Publication Data

US 2022/0194274 A1 Jun. 23, 2022

(30) Foreign Application Priority Data

Dec. 22, 2020 (CN) ......................... 202011526344.8

(51) Int. Cl.
*B60N 2/42* (2006.01)
*B60N 2/68* (2006.01)
*B60N 2/52* (2006.01)
*B60N 2/50* (2006.01)
*B60N 2/70* (2006.01)
*B60N 2/427* (2006.01)

(52) U.S. Cl.
CPC ....... *B60N 2/4263* (2013.01); *B60N 2/42763* (2013.01); *B60N 2/502* (2013.01); *B60N 2/522* (2013.01); *B60N 2/68* (2013.01); *B60N 2/7047* (2013.01)

(58) Field of Classification Search
CPC .. B60N 2/4263; B60N 2/42718; B60N 2/507; B60N 2/522
See application file for complete search history.

(56) References Cited

U.S. PATENT DOCUMENTS

| 6,254,181 | B1 * | 7/2001 | Aufrere ............... | B60N 2/4221 297/216.13 |
| 6,648,409 | B1 | 11/2003 | Laporte | |
| 7,780,235 | B2 * | 8/2010 | Teufel ................. | B60N 2/1853 297/344.17 |
| 8,042,867 | B2 * | 10/2011 | Meister ............... | B64D 11/064 297/284.11 |
| 9,241,572 | B1 * | 1/2016 | Wu ...................... | B60N 2/1853 |

(Continued)

FOREIGN PATENT DOCUMENTS

| FR | 2904586 B1 | 10/2008 | |
| KR | 2018061840 A | * 6/2018 | ........... B60N 2/4263 |
| KR | 2019041677 A | * 4/2019 | ........... B60N 2/4263 |

*Primary Examiner* — Timothy J Brindley
(74) *Attorney, Agent, or Firm* — Brooks Kushman P.C.

(57) ABSTRACT

An anti-submarine arrangement for a vehicle seat includes an elongated member pivotably attached between opposing members of a seat bottom support structure. A leg is fixedly attached to the elongated member and pivotably attached to a structural portion of the vehicle seat. The elongated member is rotatable forward and downward relative to the structural portion of the vehicle seat. A damper arrangement is attached to the leg and to the structural portion of the vehicle seat. The damper arrangement opposes a forward and downward rotation of the elongated member.

20 Claims, 2 Drawing Sheets

(56) References Cited

U.S. PATENT DOCUMENTS

| | | | |
|---|---|---|---|
| 10,710,477 B2* | 7/2020 | Yun | B60N 2/0232 |
| 10,988,058 B1* | 4/2021 | Bharsakale | B60N 2/305 |
| 2009/0152433 A1* | 6/2009 | Choi | B60N 2/1635 |
| | | | 248/421 |
| 2020/0262320 A1* | 8/2020 | Behrens | B60N 2/165 |
| 2022/0105985 A1* | 4/2022 | Kim | B60N 2/43 |

* cited by examiner

ANTI-SUBMARINE ARRANGEMENT FOR A VEHICLE SEAT

CROSS-REFERENCE TO RELATED APPLICATION

This application claims foreign priority benefits under 35 U.S.C. § 119(a)-(d) to Chinese patent application CN 2020 115 263 448 filed Dec. 22, 2020, the disclosure of which is hereby incorporated by reference in its entirety.

TECHNICAL FIELD

The present disclosure relates to an anti-submarine arrangement for a vehicle seat and a vehicle seat containing an anti-submarine arrangement.

BACKGROUND

It is known to be desirable to keep a seated occupant in a vehicle seat from moving too far forward in the presence of a large forward force, such as may be encountered in the case of a frontal impact. It may be particularly desirable to keep the seated occupant from "submarining"—i.e., moving downward and forward, especially under a lap belt. Examples of anti-submarining apparatuses are described in French patent FR2904586B1 and U.S. Pat. No. 6,648,409B1.

SUMMARY

Embodiments described herein may include an anti-submarine arrangement for a vehicle seat that has a seat bottom support structure. The anti-submarine arrangement may include an elongated member having a first end and a second end pivotably attached to opposing members of the seat bottom support structure. The embodiment may also include a pair of legs, each having a first end fixedly attached to the elongated member and each having a second end pivotably attached to a structural portion of the vehicle seat such that the elongated member is rotatable forward and downward relative to the structural portion of the vehicle seat. The embodiment may further include a damper arrangement having a first portion attached to one of the first leg or the second leg, and a second portion attached to the structural portion of the vehicle seat. The damper arrangement may be configured to oppose a forward and downward rotation of the elongated member relative to the structural portion of the vehicle seat.

Embodiments described herein may also include an anti-submarine arrangement for a vehicle seat that has a seat bottom support structure. The anti-submarine arrangement may include an elongated member having a first end and a second end, each of which is pivotably attachable to opposing members of the seat bottom support structure. A leg may have a first end fixedly attached to the elongated member and a second end pivotably attachable to a structural portion of the vehicle seat such that the elongated member is rotatable forward and downward relative to the structural portion of the vehicle seat when the elongated member is pivotably attached to the opposing members of the seat bottom support structure and the second end of the leg is pivotably attached to the structural portion of the vehicle seat. A damper arrangement may have a first portion attached to the leg and a second portion attachable to the structural portion of the vehicle seat such that the damper arrangement opposes a forward and downward rotation of the elongated member relative to the structural portion of the vehicle seat when the elongated member is pivotably attached to the opposing members of the seat bottom support structure and the second end of the leg is pivotably attached to the structural portion of the vehicle seat.

Embodiments described herein may include a vehicle seat having an anti-submarine arrangement. The vehicle seat may include a seat bottom support structure and a structural portion separate from the seat bottom support structure. An elongated member may be disposed between opposing members of the seat bottom support structure. A leg may have a first end fixedly attached to the elongated member and a second end pivotably attached to the structural portion of the vehicle seat such that the elongated member is rotatable forward and downward relative to the structural portion of the vehicle seat. A damper arrangement may have a first portion attached to the leg and a second portion attached to the structural portion of the vehicle seat. The damper arrangement may be configured to oppose a forward and downward rotation of the elongated member relative to the structural portion of the vehicle seat.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
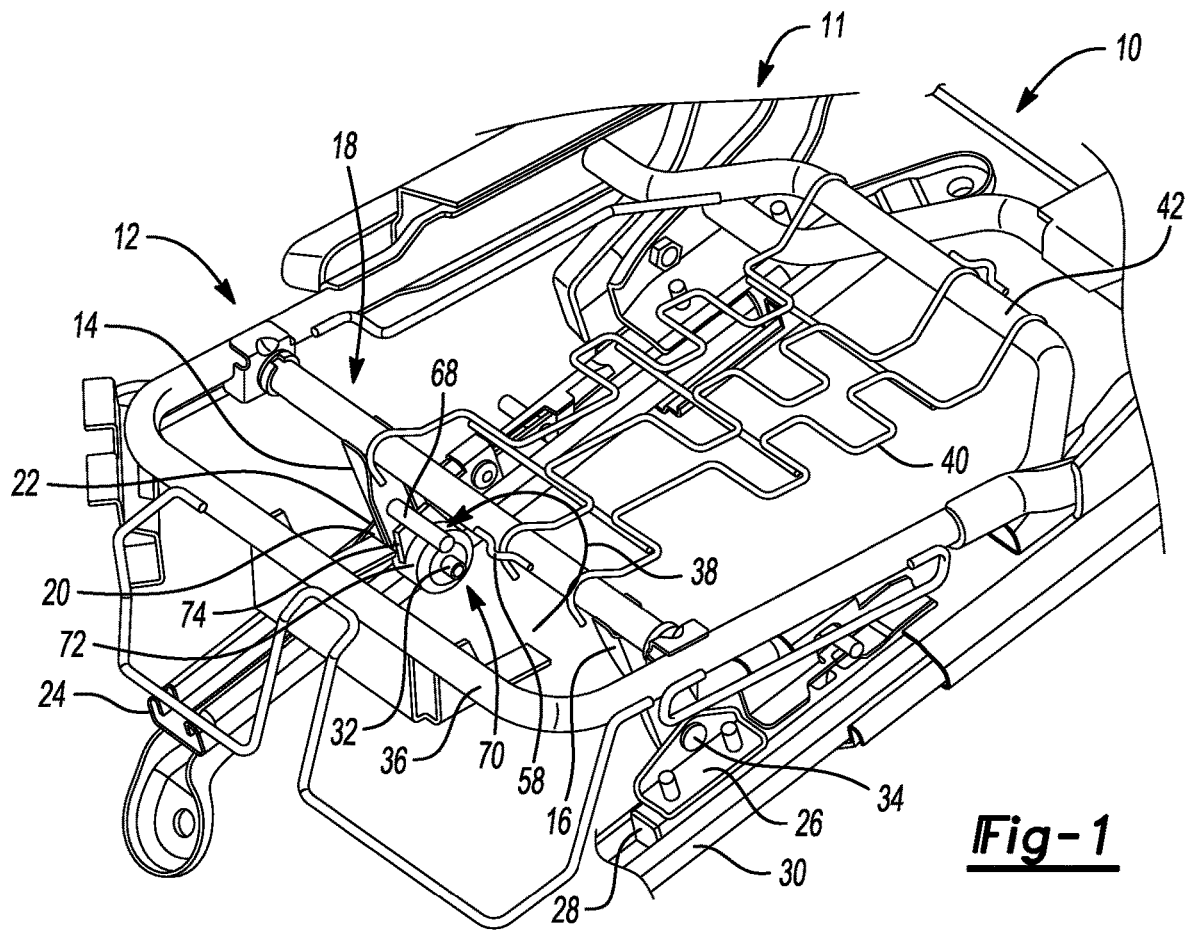
FIG. 1 shows an anti-submarine arrangement for a vehicle seat in accordance with embodiments described herein.

FIG. 1 shows a portion of a vehicle seat bottom 10, which is part of a vehicle seat 11. The seat bottom 10 includes an anti-submarine arrangement 12 in accordance with embodiments described herein. The anti-submarine arrangement 12 includes a pair of legs 14, 16 and an elongated member 18. The leg 14 is fixedly attached to the elongated member 18 at a first end 19 and pivotably attached to a bracket 20 at a second end 21—see FIG. 3. The bracket 20 is mounted on a movable seat rail 22, which is configured to move in fore-aft directions—i.e., in the forward and rearward directions—along a fixed seat rail 24. The leg 16 is also fixedly attached to the elongated member 18 at a first end 25 and pivotably attached to a bracket 26 at a second end 27—see FIG. 3.

The bracket 26 is mounted on a movable seat rail 28, which is also configured to move fore-aft along a fixed seat rail 30. The leg 14 is attached to the bracket 20 through a pivot pin 32, and the leg 16 is attached to the bracket 26 through a pivot pin 34. Although this embodiment includes two legs 14, 16, other embodiments may include fewer or more than two legs. Each of the legs 14, 16 is attached to a structural portion of the vehicle seat 11, which in this embodiment includes the brackets 20, 26, which are in turn attached to a floor of the vehicle through the movable seat rails 22, 28, and the fixed seat rails 24, 30. Thus, the seat 11 includes a pair of movable rails 22, 28 and a pair of fixed rails 24, 30.

The elongated member 18 of the anti-submarine arrangement 12 is pivotably attached to a portion of a seat bottom support structure 36. More specifically, the elongated member 18 has a first end 37 and a second end 39, each of which is pivotably attached to opposing members 41, 43 of the seat bottom support structure 36—see FIG. 2. The seat bottom support structure 36 is a frame structure of the seat bottom 10, and more particularly, a banana-link assembly of the seat bottom 10. In the presence of a large forward force—for example, if the vehicle is involved in a frontal impact—the anti-submarine arrangement 12 will guide the seat bottom 10 to rotate forward and downward relative to the structural portion of the vehicle seat 11. More specifically, the elongated member 18 will rotate forward and downward relative to the structural portion of the vehicle seat as indicated by directional arrow 38. For reference, the structural portion of the seat may be the brackets 20, 26, the movable rails 22, 28, the fixed rails 24, 30, the vehicle floor, or all of them. As described above, the legs 14, 16 are directly attached to the brackets 20, 26 and indirectly attached to the movable rails 22, 28, the fixed rails 24, 30, and the vehicle floor.

Also shown in FIG. 1 is a spring mat 40 connected at one end to the elongated member 18 and at the other end to a crossbar 42 of the banana-link assembly 36. When the elongated member 18 moves forward and downward, the spring mat 40 is not stretched to oppose the motion because the banana-link assembly 36 also moves forward and downward. In other embodiments, a spring mat, such as the spring mat 40 may be attached to a structural member that does not move in conjunction with movement of the anti-submarine arrangement 12. In such a configuration, the spring mat may stretch and oppose the motion of the elongated member 18 as it moves forward and downward.

Figure 2:
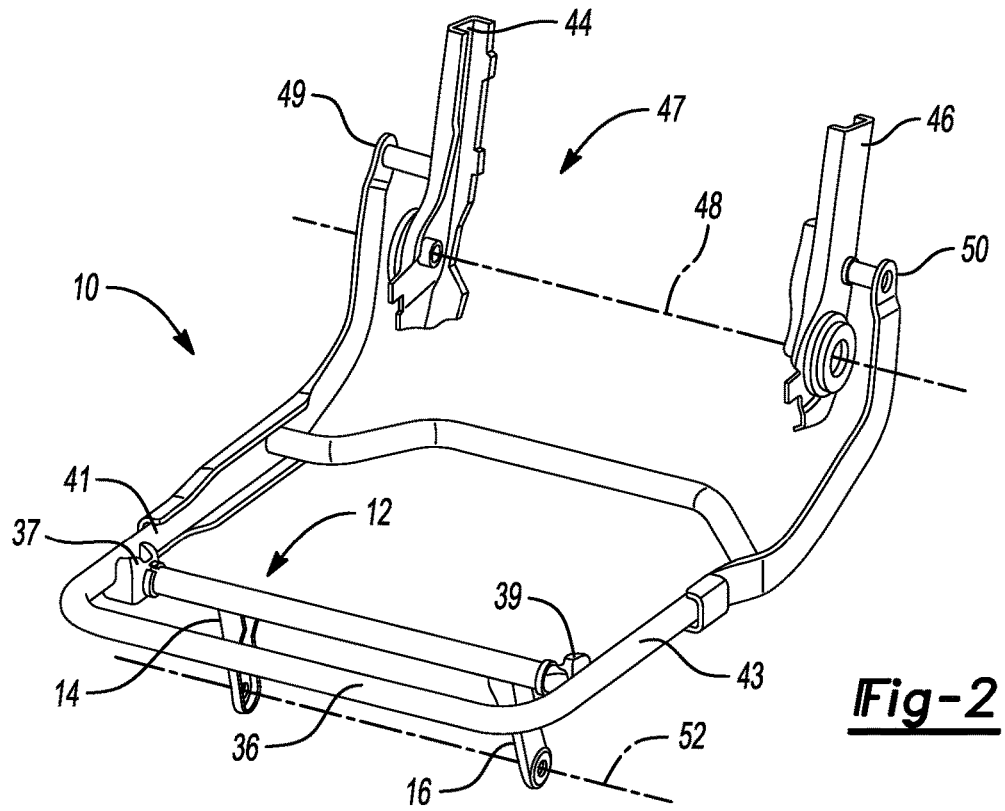
FIG. 2 shows the anti-submarine arrangement and a portion of a seat-bottom frame detached from the vehicle seat.

FIG. 2 shows two brackets 44, 46, which are attached to and part of a seat back 47 of the vehicle seat 11. The seat back 47 and the brackets 44, 46 rotate around an axis 48 relative to the seat bottom 10. As described above, when the elongated member 18 rotates forward and downward, the banana-link assembly 36 also rotates forward and downward. As shown in FIG. 2 the banana-link assembly 36 is pivotably attached to the brackets 44, 46 at pivot points 49, 50. Therefore, when the banana-link assembly 36 moves forward and downward it causes the seat back 47 to rotate forward and downward around the axis 48. FIG. 2 also shows an axis 52 about which the legs 14, 16 will rotate in the event of a frontal impact of the vehicle. The pivot pins 32, 34 are positioned along the axis 52—see FIG. 1.

Figure 3:
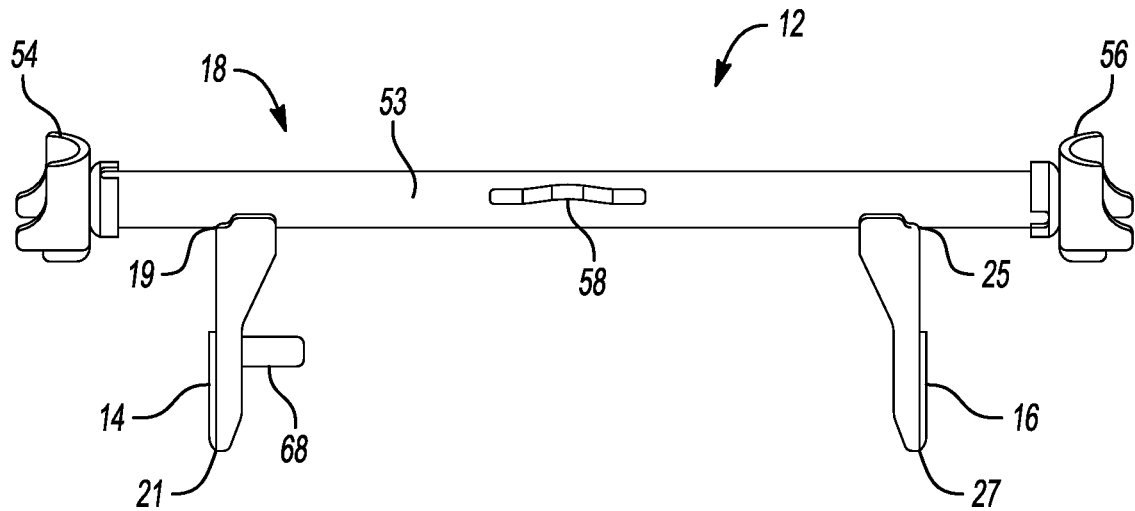
FIG. 3 shows an assembled view of the anti-submarine arrangement detached from the vehicle seat.

FIG. 3 shows components of the anti-submarine arrangement 12 in an assembled state. Specifically, the elongated member 18 includes a tubular portion 53 and two end assemblies, more specifically, a first end assembly 54 and a second end assembly 56. Attached to the elongated member 18 is a securing element, or link 58. In this embodiment the tubular portion 53 is configured as a hollow bar with a circular cross section, although in other embodiments an elongated member may include a solid bar, it may have a non-circular cross section, or some combination of any of the above.

Figure 4:
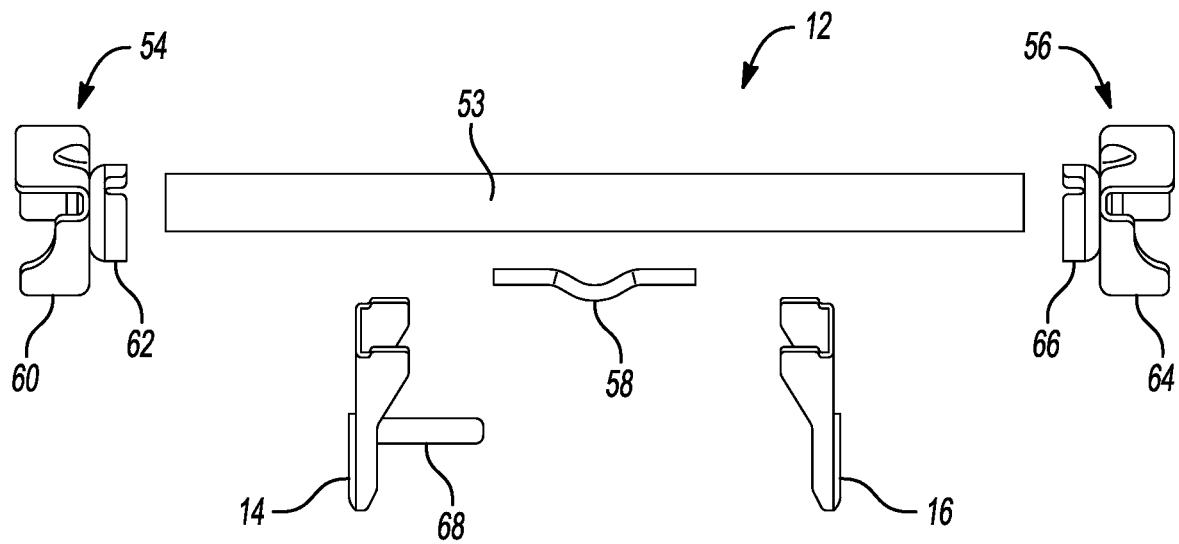
FIG. 4 shows an exploded view of the anti-submarine arrangement.

As shown in FIG. 1, the link 58 helps to secure an end of the spring mat 40 to the elongated member 18. An exploded view of the anti-submarine arrangement 12 is shown in FIG. 4. Two portions 60, 62 of the end assembly 54 are riveted to each other such that they can rotate relative to each other. Similarly, two components 64, 66 of the end assembly 56 are riveted to each other, which again, allows them to rotate relative to each other. Each of the end assemblies 54, 56 is welded to the tubular portion 53. The legs 14, 16 and the link 58 are also welded to the elongated member 18 to complete assembly of the anti-submarine arrangement 12. As shown in FIGS. 3 and 4, the leg 14 includes an arm 68, which extends from and is rotatable with the leg 14. The arm 68 is part of a damper arrangement 70—see FIG. 1—which in this embodiment is part of the anti-submarine arrangement 12.

As shown in FIG. 1, the damper arrangement 70 includes a first portion, which in this embodiment is the arm 68 of the leg 14. The damper arrangement 70 also includes a second portion, which in this embodiment is a spring 72, and more specifically, a torsional spring. The spring 72 has one end fixed to the pivot pin 32 and one end rotatable with the arm 68. A snap ring holds the spring 72 on the pivot pin 32. A latch 74, which is a third portion of the damper arrangement 70, can rotate relative to the pivot pin 32. The latch 74 cooperates with the arm 68, such that when the elongated member 18 rotates forward and downward, the latch 74 rotates with the leg 14 and the spring 72 opposes the rotation of the elongated member 18 and acts to dampen its movement. The damper arrangement 70 also reduces the fold down speed of the seat back 47 and reduces the lifting force necessary for an occupant to return the seat back 47 from the folded-down position to the upright, use position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An anti-submarine arrangement for a vehicle seat having a seat bottom support structure, the anti-submarine arrangement comprising:
   an elongated member having a first end and a second end pivotably attached to opposing members of the seat bottom support structure;
   a first leg and a second leg each having a first end fixedly attached to the elongated member and each having a second end pivotably attached to a structural portion of the vehicle seat such that the elongated member is rotatable forward and downward relative to the structural portion of the vehicle seat; and
   a damper arrangement having a first portion attached to one of the first leg or the second leg, and a second portion attached to the structural portion of the vehicle seat, the damper arrangement being configured to oppose a forward and downward rotation of the elongated member relative to the structural portion of the vehicle seat.

2. The anti-submarine arrangement of claim 1, wherein the first portion of the damper arrangement includes an arm extending from and rotatable with one of the first leg or the second leg, and the second portion of the damper arrangement includes a torsional spring having a first end fixed and a second end rotatable with the arm.

3. The anti-submarine arrangement of claim 2, wherein the damper arrangement includes a third portion having a first part attached to the second end of the torsional spring and a second part attached to the arm.

4. The anti-submarine arrangement of claim 1, wherein the elongated member includes a tubular portion disposed between a first end assembly and a second end assembly, each of the first end assembly and the second end assembly including two portions pivotably attached to each other, one of the two portions of each of the first end assembly and the second end assembly being fixedly attached to the elongated member, and the other of the two portions of each of the first end assembly and the second end assembly being fixedly attached to opposing members of the seat bottom support structure.

5. The anti-submarine arrangement of claim 1, wherein the structural portion of the vehicle seat includes a pair of fixed rails and a pair of movable rails, each of the movable rails being movable in fore-aft directions along a respective one of the fixed rails, and wherein the second end of each of the first leg and second leg is attached to a respective one of the movable rails.

6. The anti-submarine arrangement of claim 1, wherein the seat bottom support structure is pivotably connected to a seat back such that the seat back rotates forward and downward when the elongated member rotates forward and downward relative to the structural portion of the vehicle seat.

7. The anti-submarine arrangement of claim 1, further comprising a securing element fixedly attached to the elongated member, and wherein the seat bottom support structure includes a spring mat secured between the securing element and the elongated member.

8. An anti-submarine arrangement for a vehicle seat having a seat bottom support structure, the anti-submarine arrangement comprising:
an elongated member having a first end and a second end, each of the first end and the second end being pivotably attachable to opposing members of the seat bottom support structure;
a leg having a first end fixedly attached to the elongated member and having a second end pivotably attachable to a structural portion of the vehicle seat such that the elongated member is rotatable forward and downward relative to the structural portion of the vehicle seat when the elongated member is pivotably attached to the opposing members of the seat bottom support structure and the second end of the leg is pivotably attached to the structural portion of the vehicle seat; and
a damper arrangement having a first portion attached to the leg, and a second portion attachable to the structural portion of the vehicle seat such that the damper arrangement opposes a forward and downward rotation of the elongated member relative to the structural portion of the vehicle seat when the elongated member is pivotably attached to the opposing members of the seat bottom support structure and the second end of the leg is pivotably attached to the structural portion of the vehicle seat.

9. The anti-submarine arrangement of claim 8, wherein the first portion of the damper arrangement includes an arm extending from and rotatable with the leg, and the second portion includes a torsional spring having one end fixed and one end rotatable with the arm.

10. The anti-submarine arrangement of claim 9, wherein the damper arrangement includes a third portion having a first part attached to the one end of the torsional spring that is rotatable with the arm and a second part attached to the arm.

11. The anti-submarine arrangement of claim 8, wherein each of the first end and the second end of the elongated member includes a respective end assembly, each of the end assemblies including two portions pivotably attached to each other, one of the two portions of each of the end assemblies being fixedly attached to the elongated member, and the other of the two portions of each of the end assemblies being configured for fixed attachment to the seat bottom support structure.

12. The anti-submarine arrangement of claim 8, further comprising two of the legs, and wherein the second end of each leg is configured for attachment to a respective movable rail of the vehicle seat.

13. The anti-submarine arrangement of claim 8, further comprising a securing element fixedly attached to the elongated member and configured to receive a spring mat of the seat bottom support structure to secure the spring mat between the securing element and the elongated member.

14. A vehicle seat having an anti-submarine arrangement, comprising:
a seat bottom support structure;
a structural portion separate from the seat bottom support structure;
an elongated member disposed between opposing members of the seat bottom support structure;
a leg having a first end fixedly attached to the elongated member and a second end pivotably attached to the structural portion of the vehicle seat such that the elongated member is rotatable forward and downward relative to the structural portion of the vehicle seat; and
a damper arrangement having a first portion attached to the leg, and a second portion attached to the structural portion of the vehicle seat such that the damper arrangement opposes a forward and downward rotation of the elongated member relative to the structural portion of the vehicle seat.

15. The vehicle seat of claim 14, wherein the elongated member includes a tubular portion disposed between a first end assembly and a second end assembly, each of the first end assembly and the second end assembly including two portions pivotably attached to each other, one of the two portions of each of the first end assembly and the second end assembly being fixedly attached to the elongated member, and the other of the two portions of each of the first end assembly and the second end assembly being fixedly attached to opposing members of the seat bottom support structure.

16. The vehicle seat of claim 14, further comprising two of the legs, and wherein the structural portion includes a pair of fixed rails and a pair of movable rails, each of the movable rails being movable in fore-aft directions along a respective one of the fixed rails, and wherein the second end of each leg is attached to a respective one of the movable rails.

17. The vehicle seat of claim 14, wherein the seat bottom support structure is pivotably connected to a seat back such that the seat back rotates forward and downward when the elongated member rotates forward and downward relative to the structural portion.

18. The vehicle seat of claim 14, further comprising a securing element fixedly attached to the elongated member, and wherein the seat bottom support structure includes a spring mat secured between the securing element and the elongated member.

19. The vehicle seat of claim 14, wherein the first portion of the damper arrangement includes an arm extending from and rotatable with the leg, and the second portion of the damper arrangement includes a torsional spring having a first end fixed and a second end rotatable with the arm.

20. The vehicle seat of claim 19, wherein the damper arrangement includes a third portion disposed between the second end of the torsional spring and the arm.

\* \* \* \* \*